United States Patent
Miyazaki et al.

(10) Patent No.: US 6,822,694 B2
(45) Date of Patent: Nov. 23, 2004

(54) SIGNAL PROCESSING APPARATUS

(75) Inventors: Shinichiro Miyazaki, Kanagawa (JP); Hiroyuki Kojima, Kanagawa (JP); Akira Shirahama, Kanagawa (JP); Hiroshi Sugaya, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/203,923

(22) Filed: Dec. 2, 1998

(65) Prior Publication Data

US 2002/0105594 A1 Aug. 8, 2002

(30) Foreign Application Priority Data

Dec. 4, 1997 (JP) ................................. 9-333999

(51) Int. Cl.$^7$ .......................... H04N 9/68; H04N 9/67; H04N 9/74; H04N 9/76
(52) U.S. Cl. ...................... 348/584; 348/590; 348/598; 348/599; 348/646; 348/660
(58) Field of Search ................................ 348/584, 588, 348/589, 590, 598, 599, 600, 645, 646, 659, 660, 661; H04N 9/74, 9/76, 9/68, 9/67

(56) References Cited

U.S. PATENT DOCUMENTS

| | | | | |
|---|---|---|---|---|
| 5,159,453 A | * | 10/1992 | Dhein et al. ................. | 358/142 |
| 5,534,942 A | | 7/1996 | Beyers, Jr. et al. | |
| 5,550,597 A | * | 8/1996 | Wada et al. ................ | 348/708 |
| 5,568,204 A | * | 10/1996 | Takamori ..................... | 348/584 |
| 5,712,687 A | * | 1/1998 | Naveen et al. .............. | 348/453 |
| 5,745,186 A | * | 4/1998 | Shimizu et al. ............. | 348/562 |
| 5,969,767 A | * | 10/1999 | Ishikawa et al. ........... | 348/564 |
| 5,982,455 A | * | 11/1999 | Steele et al. ................ | 348/631 |
| 6,061,099 A | * | 5/2000 | Hostetler .................... | 348/584 |
| 6,188,730 B1 | * | 2/2001 | Ngai et al. ............. | 375/240.21 |
| 6,307,592 B1 | * | 10/2001 | Go ............................. | 348/450 |

FOREIGN PATENT DOCUMENTS

| | | | |
|---|---|---|---|
| EP | 0862334 A2 | * | 2/1998 |
| EP | 0921693 | * | 6/1999 |

* cited by examiner

Primary Examiner—Brian P. Yenke
(74) Attorney, Agent, or Firm—Frommer Lawrence & Haug LLP; William S. Frommer

(57) ABSTRACT

According to the signal processing apparatus of the present invention, in a text signal processing circuit, predetermined signal processes are executed to a luminance signal Y and color difference signals U and V in which a ratio of sampling clocks is equal to (4:4:4) and resultant signals are supplied to a mixing circuit. In a video signal processing circuit, predetermined signal processes are executed to the signals Y, U, and V in which a ratio of sampling clocks is equal to (4:1:1) or (4:2:2). The signal Y is supplied to the mixing circuit through a delay adjusting circuit and the high frequency components are removed from the signals U and V by a band limiting filter and, after that, the resultant signals are supplied to the mixing circuit. The signal mixed by the mixing circuit is supplied to a LPF through a D/A converter. In the LPF, the signal is demodulated by the band limiting filter according to (4:4:4).

5 Claims, 6 Drawing Sheets

$1+z^{-1}$
$\cos(wT/2)$ $1+z^{-2}$
$\cos(wT)$ $(1+z^{-1})(1+z^{-2})$
$\cos(wT/2)\cos(wT)$

SIGNAL PROCESSING APPARATUS

BACKGROUND OF THE INVENTION

1. Field of the Invention

The invention relates to a signal processing apparatus suitable for use in a television set.

2. Description of the Related Art

A block diagram of a conventional signal processing apparatus is shown in FIG. 1. First in FIG. 1, a text signal or a personal computer signal (hereinafter, simply referred to a text signal) of characters or the like comprising analog luminance signal Y and color difference signals U and V is inputted from input terminals 51Y, 51U, and 51V. The inputted luminance signal Y and color difference signals U and V are supplied to A/D converters 52Y, 52U, and 52V. In the A/D converters 52Y, 52U, and 52V, the supplied luminance signal Y and color difference signals U and V are converted into digital signals at predetermined sampling frequencies and the text signal of the digital component signals is supplied to a text signal processing circuit 53. A ratio of the sampling frequencies in the A/D converters 52Y, 52U, and 52V is set to (Y:U:V)=(4:4:4).

A field memory 54 is connected to the text signal processing circuit 53. In the text signal processing circuit 53, predetermined signal processes are performed to the luminance signal Y and color difference signals U and V. The signal processed luminance signal Y and color difference signals U and V are supplied to a mixing circuit 55.

A video signal comprising the analog luminance signal Y and color difference signals U and V is inputted from input terminals 56Y, 56U, and 56V. The inputted luminance signal Y and color difference signals U and V are supplied to A/D converters 57Y, 57U, and 57V. In the A/D converters 57Y, 57U, and 57V, the supplied luminance signal Y and color difference signals U and V are converted into digital signals at predetermined sampling frequencies. A video signal of digital component signals is supplied to a video signal processing circuit 58. A ratio of the sampling frequencies in the A/D converters 57Y, 57U, and 57V is set to (4:1:1) or (4:2:2).

A field memory 59 is connected to the video signal processing circuit 58. In the video signal processing circuit 58, predetermined signal processes are performed to the luminance signal Y and color difference signals U and V. The signal processed luminance signal Y and color difference signals U and V are supplied to the mixing circuit 55.

In the mixing circuit 55, the text signal of (4:4:4) and the video signal of (4:1:1) or (4:2:2) are, for instance, switched and mixed. An output of the mixing circuit 55 is supplied to D/A converters 60Y, 60U, and 60V.

In the D/A converters 60Y, 60U, and 60V, the luminance signal Y and color difference signals U and V are converted into analog signals. The analog luminance signal Y and color difference signals U and V are supplied to LPFs (low pass filters) 61Y, 61U, and 61V. In the LPFs 61Y, 61U, and 61V, filter processes are performed to the luminance signal Y and color difference signals U and V in order to remove unnecessary signals. The filter processed luminance signal Y and color difference signals U and V are outputted from output terminals 62Y, 62U, and 62V.

To clearly display characters, in the text signal, it is assumed that the color difference signals U and V and luminance signal Y have a similar band. Therefore, the ratio of the sampling frequencies is set to (4:4:4). On the other hand, in the video signal, a ratio of the sampling frequencies is set to (4:1:1) or (4:2:2) because the band of the color difference signals is narrower than that of the luminance signal Y. Thus, the capacity of the memory that is necessary for the signal processes can be saved. For the purpose of commonly using the D/A converter, two signals of the text signal of (4:4:4) and the video signal of (4:1:1) or (4:2:2) are mixed by digital signals prior to D/A converting. The band of the LPF after the D/A converter is matched with the band of the text signal together with the luminance signal Y and color difference signals U and V.

However, in the conventional system, since the band of the LPF at the post stage of the D/A converter is set to the wide band according to the band on the text signal side, the high frequency components (the harmonics components) of the color difference signals on the video signal side cannot be sufficiently attenuated. For example, as shown in FIG. 2, there is a problem such that oblique color edges which draw a diagonal line become a stairway shape.

On the other hand, if the band of the LPF is matched with the narrow band of the color difference signal of the video signal, since the high component of the text signal is eliminated, the color difference signals of the text signal become dull and there is a problem such that a color blur occurs and it is very hard to read the text.

OBJECTS AND SUMMARY OF THE INVENTION

It is, therefore, the invention to provide a signal processing apparatus to which a band limiting filter which can sufficiently attenuate the high frequency components of the color difference signals of the video signal is applied.

The invention is provided a signal processing apparatus for mixing a first digital component signal and a second digital component signal in which a sampling frequency of a color component is lower than that of the first digital component signal, characterized by comprising: a digital filter for performing a band limitation to the color component of the second digital component signal; mixing means for mixing the first digital component signal and the second digital component signal; D/A converting means for D/A converting an output of the mixing means; and a filter for performing a band limitation to an analog signal converted by the D/A converting means.

According to the invention, the high frequency components are removed from the color difference signals of the video signal (second digital component signal) of the ratio of the sampling frequencies of (4:2:2) or (4:1:1) by using a digital band limiting filter. After that, those signals are mixed and the mixed signal is D/A converted. Therefore, even if the band of the LPF at the post stage of the D/A converter is set to the wide band according to that of the text signal or the personal computer signal (first digital component signal) of the ratio of the sampling frequencies of (4:4:4), the oblique color edges are smoothly displayed.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
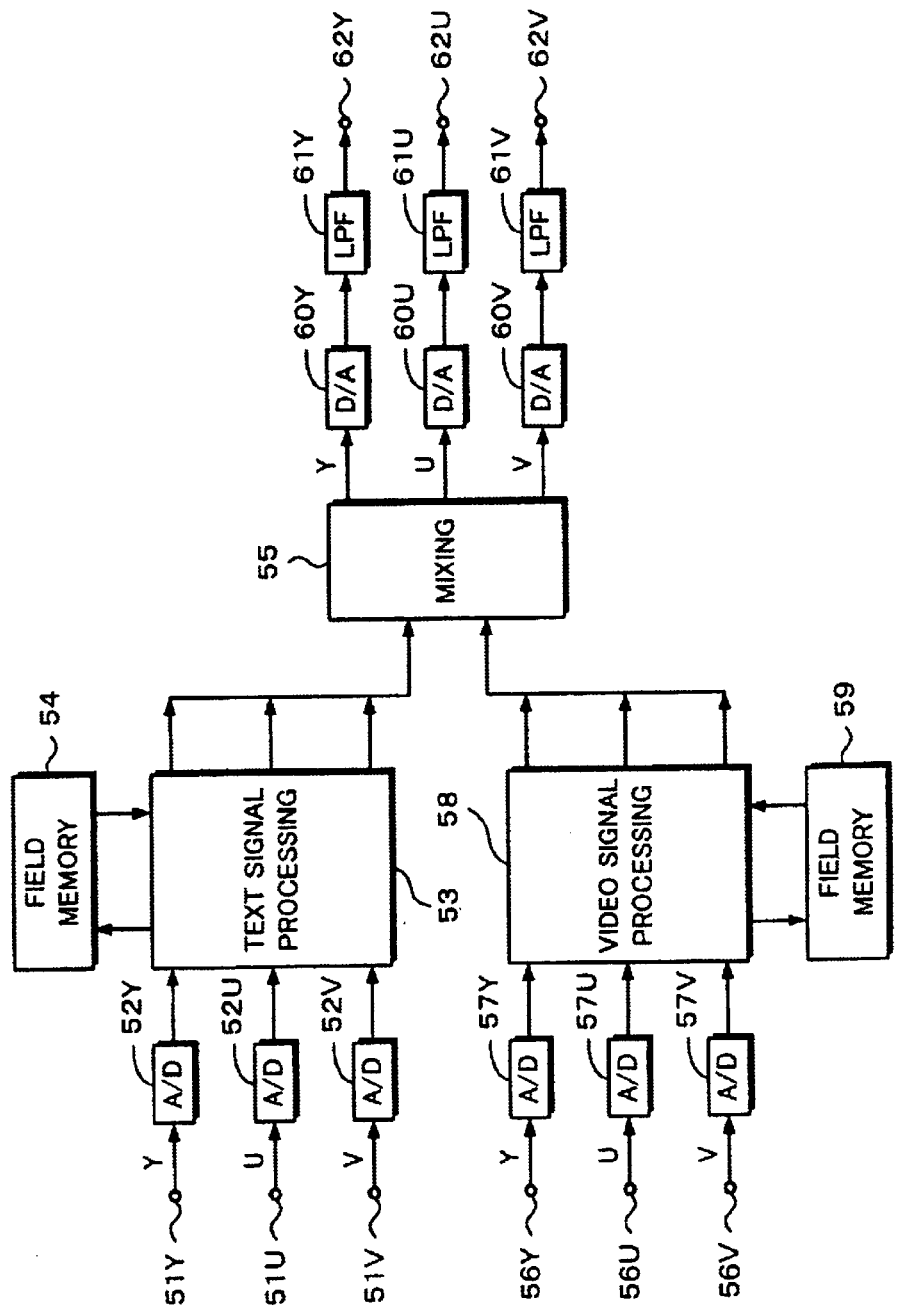
FIG. 1 is a block diagram of a conventional signal processing apparatus.
Figure 2:
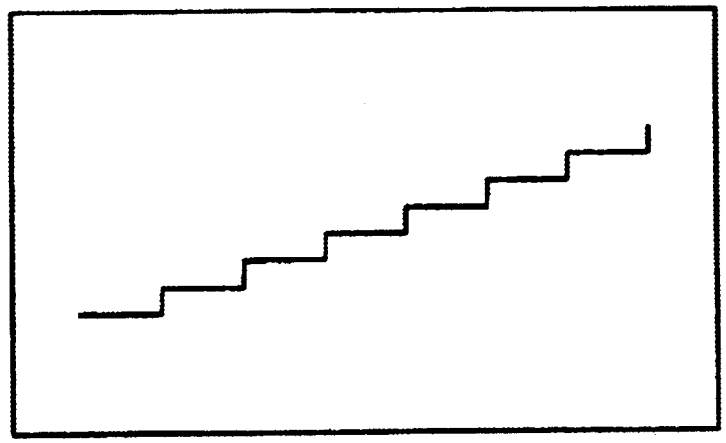
FIG. 2 is an example of a display picture plane of color difference signals of a video image in the case where a passing band of an LPF of the color difference signal is matched to that of a text.
Figure 3:
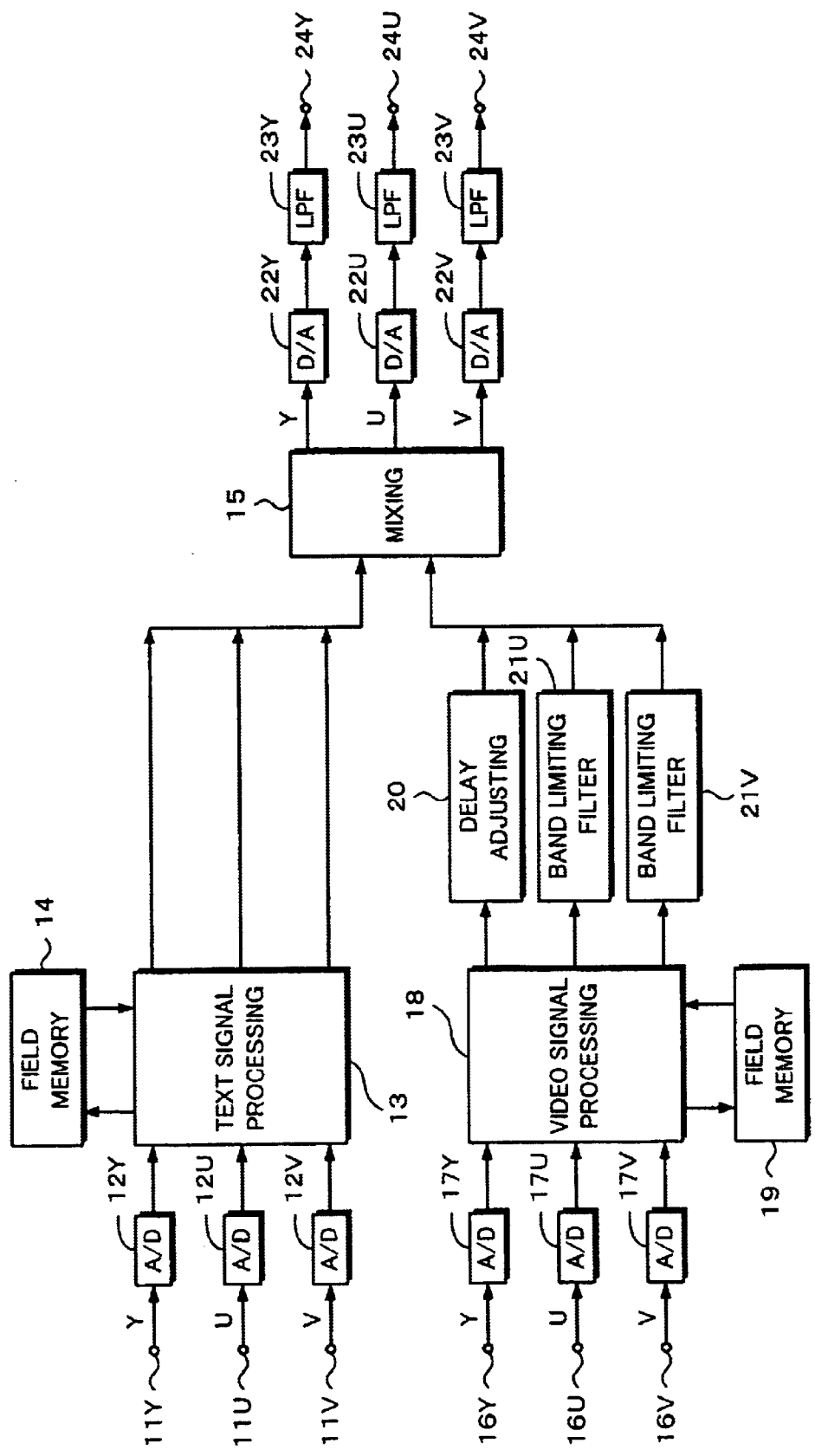
FIG. 3 is a block diagram of an embodiment of a signal processing apparatus to which the invention is applied.

An embodiment of the invention will now be described hereinbelow with reference to the drawings. FIG. 3 shows a whole construction of the embodiment to which the invention is applied. A text signal of characters or the like comprising the analog luminance signal Y and color difference signals U and V is inputted from input terminals 11Y, 11U, and 11V. The inputted luminance signal Y and color difference signals U and V are supplied to A/D converters 12Y, 12U, and 12V. In the A/D converters 12Y, 12U, and 12V, the supplied luminance signal Y and color difference signals U and V are converted into digital signals at predetermined sampling frequencies. The text signal of the digital component signal is supplied to a text signal processing circuit 13. A ratio of the sampling frequencies in the A/D converters 12Y, 12U, and 12V is set to (4:4:4).

The luminance signal Y and color difference signals U and V are supplied to a field memory 14 connected to the text signal processing circuit 13 and are stored. In the text signal processing circuit 13, predetermined signal processes such as interpolating process, scaling, and the like are executed to the luminance signal Y and color difference signals U and V stored in the field memory 14 by, for example, a filter to operate a size. The signal processed luminance signal Y and color difference signals U and V are supplied to a mixing circuit 15.

The analog luminance signal Y and color difference signals U and V are supplied from input terminals 16Y, 16U, and 16V. The inputted luminance signal Y and color difference signals U and V are supplied to A/D converters 17Y, 17U, and 17V. In the A/D converters 17Y, 17U, and 17V, the supplied luminance signal Y and color difference signals U and V are converted into digital signals at predetermined sampling frequencies. The video signal of the digital component signal is supplied to a video signal processing circuit 18. A ratio of the sampling frequencies in the A/D converters 17Y, 17U, and 17V is set to (4:1:1) or (4:2:2).

The luminance signal Y and color difference signals U and V are supplied to a field memory 19 connected to the video signal processing circuit 18 and are stored. In the video signal processing circuit 18, predetermined signal processes such as interpolating process, scaling, and the like are executed to the luminance signal Y and color difference signals U and V stored in the field memory 19 by, for example, a filter to operate a size.

The signal processed luminance signal Y is delayed by a delay adjusting circuit 20 for the purpose of timing adjustment and, after that, it is supplied to the mixing circuit 15. The signal processed color difference signals U and V are supplied to band limiting filters 21U and 21V. As will be explained hereinlater, the band limiting filters 21U and 21V remove high frequency components of the color difference signals U and V in accordance with the ratio of the sampling frequencies of (4:1:1) or (4:2:2). The color difference signals U and V from which the high frequency components were removed are supplied to the mixing circuit 15.

In the mixing circuit 15, the luminance signal Y from the text signal processing circuit 13 and the luminance signal Y from the delay adjusting circuit 20 are switched by, for example, a high speed switch or the like and are mixed. Similarly, in the mixing circuit 15, the color difference signals U and V from the text signal processing circuit 13 and the color difference signals U and V from the band limiting filters 21U and 21V are switched and mixed. The luminance signal Y and color difference signals U and V from the mixing circuit 15 are supplied to D/A converters 22Y, 22U, and 22V.

In the D/A converters 22Y, 22U, and 22V, the supplied luminance signal Y and color difference signals U and V are converted to analog signals. The analog luminance signal Y and color difference signals U and V are supplied to LPFs 23Y, 23U, and 23V. In the LPFs 23Y, 23U, and 3V, filter processes are executed to the supplied luminance signal Y and color difference signals U and V. After that, the resultant signals are outputted from output terminals 24Y, 24U, and 24V. Passing bands of the LPFs 23Y, 23U, and 23V are set in accordance with (4:4:4).

Figure 4:
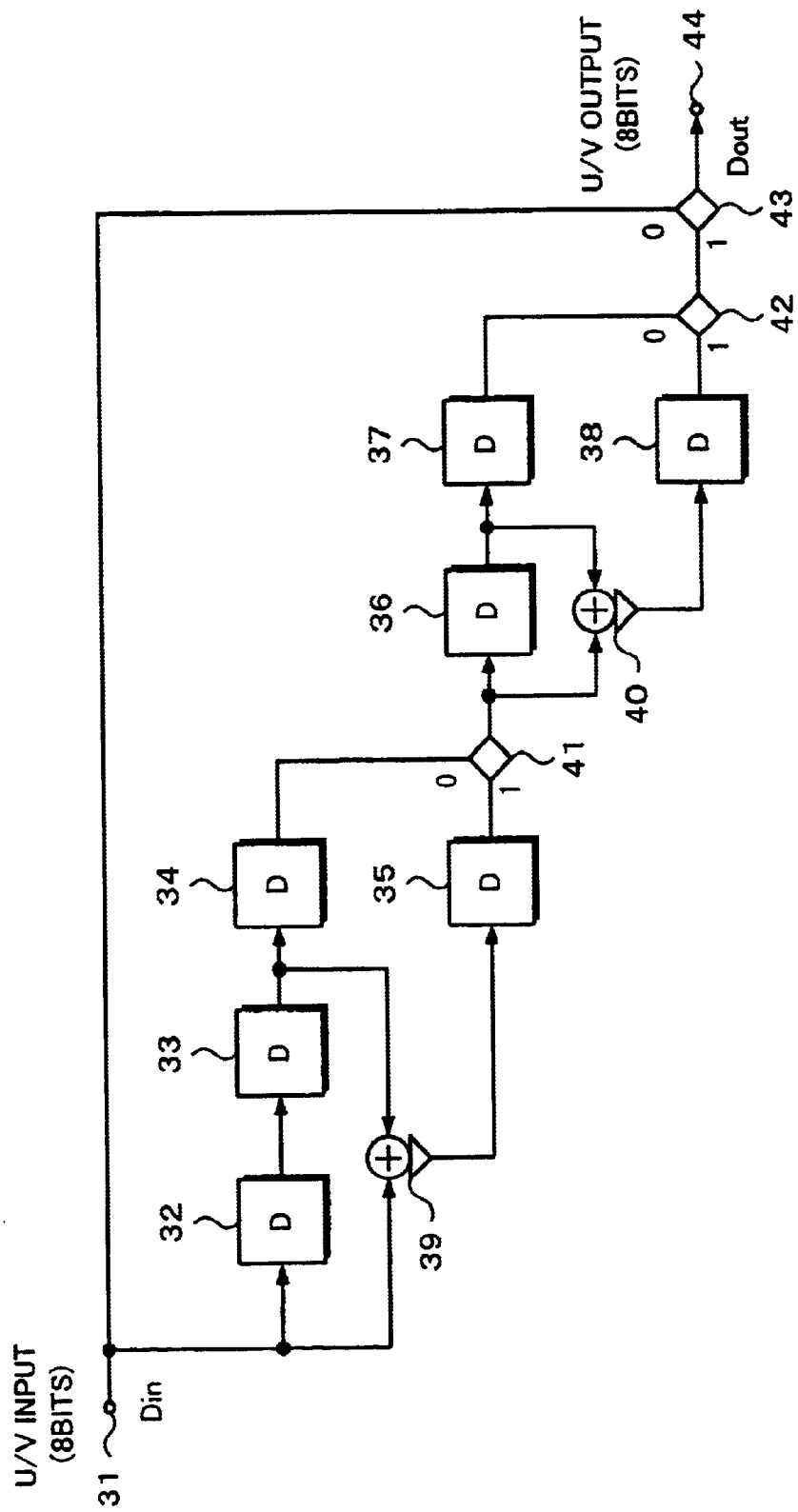
FIG. 4 is an example of a construction of a band limiting filter of the invention.

An example of the band limiting filters 21U and 21V for the color difference signals U and V of the digital video signal is shown in FIG. 4. The band limiting filters in FIG. 4 for the color difference signals U and V have the same construction. The color difference signal in which one sample consists of 8 bits is supplied from an input terminal 31. The supplied color difference signal is transmitted to a D flip-flop 32, an adder 39, and a selector 43. The D flip-flop which is used in FIG. 4 can perform parallel processes of 8 bits. The color difference signal supplied to the D flip-flop 32 is sent to a selector 41 through D flip-flops 33 and 34. The color difference signal from the D flip-flop 32 is supplied to the adder 39 through the D flip-flop 33.

In the adder 39, the color difference signal from the input terminal 31 and the color difference signal from the D flip-flop 33 are added. The adder 39 is an adder of 8 bits. After a 1-bit shift for gain adjustment was performed to an addition result, namely, after the addition result was set to ½, a resultant signal is outputted. A digital filter having a transfer function (1+z−2) is constructed by the D flip-flops 32 and 33 and adder 39. An output (color difference signal) of the adder 39 is supplied to the selector 41 through a D flip-flop 35.

In the selector 41 to which the color difference signals are supplied from the D flip-flops 34 and 35, either one of them is selected and outputted. The selector 41 is a switch of two inputs and one output of 8 bits. The color difference signal selected by the selector 41 is supplied to a D flip-flop 36 and an adder 40.

The color difference signal supplied to the D flip-flop 36 is supplied to a selector 42 through a D flip-flop 37. The color difference signal supplied to the D flip-flop 36 is sent to the adder 40.

In the adder 40, the color difference signal from the selector 41 and the color difference signal from the D flip-flop 36 are added. In a manner similar to the foregoing adder 39, the adder 40 is an adder of 8 bits. After a 1-bit shift for gain adjustment was performed to an addition result, a resultant signal is outputted. A digital filter having a transfer function (1+z−1) is constructed by the D flip-flop 36 and adder 40. An output (color difference signal) of the adder 40 is supplied to the selector 42 through a D flip-flop 38.

In the selector 42 to which the color difference signals are supplied from the D flip-flops 37 and 38, either one of them is selected and outputted. The selector 42 is a switch of two inputs and one output of 8 bits in a manner similar to the foregoing selector 41. The color difference signal selected by the selector 42 is supplied to the selector 43. In the selector 43 to which the color difference signal is supplied from the input terminal 31 and selector 42, either one of them is selected and outputted from an output terminal 44.

The band limiting filter switches the selectors 41, 42, and 43 in accordance with each of the cases where the ratio of the sampling frequencies of the YUV signals is equal to (4:4:4), (4:2:2), and (4:1:1). As shown below, when the inputted ratio of the sampling frequencies is equal to (4:4:4), the filter is made through; in case of (4:2:2), the filter is switched to the filter of the transfer function $(1+z-1)$; and in case of (4:1:1), the filter is switched to the filter of the transfer function $(1+z-1)(1+z-2)$. Frequency characteristics in those cases are also shown below.

| Y:U:V | U/V selector | Transfer function | Frequency characteristics |
|---|---|---|---|
| 4:4:4 | 100 | | |
| 4:2:2 | 110 | $(1 + z - 1)$ | $\cos(wT/2)$ |
| 4:1:1 | 111 | $(1 + z - 1)(1+z-2)$ | $\cos(wT/2)\cos(wT)$ | where, the U/V selector sequentially shows the selecting states of the selectors 43, 42, and 41.

For example, when the ratio of the sampling frequencies is equal to (4:4:4), the selectors 41 and 42 select the color difference signal of the input shown at 0 in the diagram and the selector 43 selects the color difference signal of the input shown at 1 in the diagram. When the ratio of the sampling frequencies is equal to (4:2:2), the selector 41 selects the color difference signal of the input shown at 0 in the diagram. The selectors 42 and 43 select the color difference signal of the input shown at 1 in the diagram. When the ratio of the sampling frequencies is equal to (4:2:2), the selectors 41, 42, and 43 select the color difference signal of the input shown at 1 in the diagram.

Figure 5:
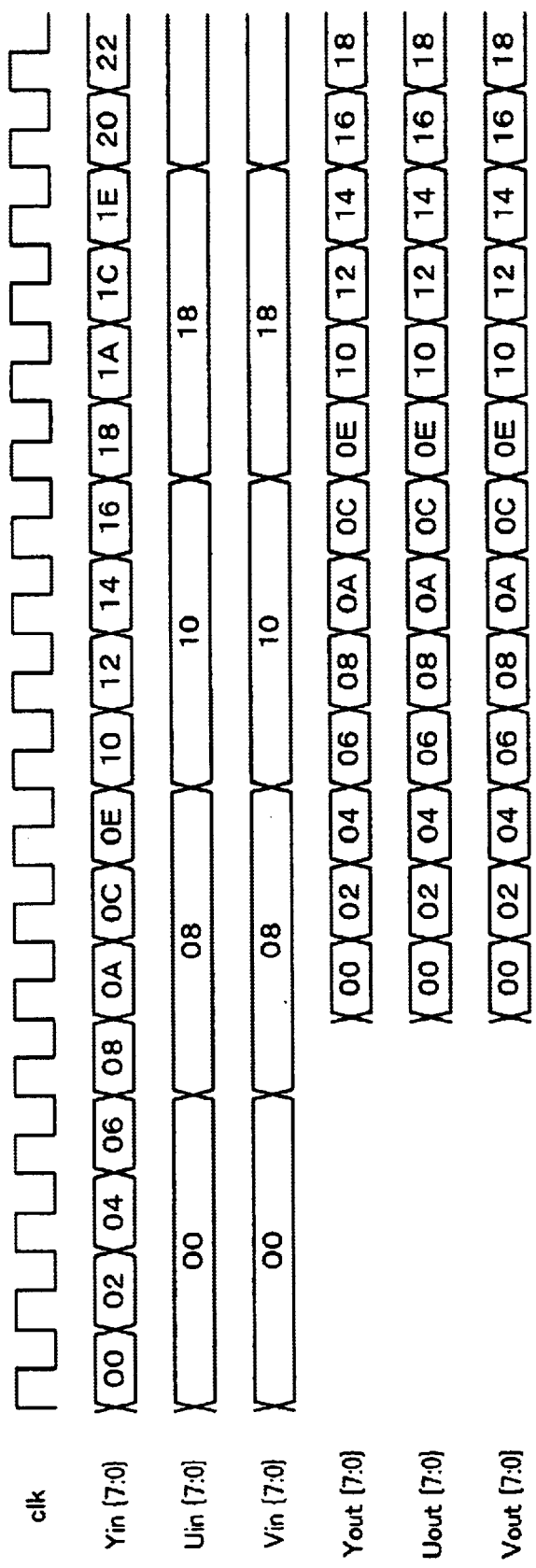
FIG. 5 is an example of a simulation result of the band limiting filter of the invention.

FIG. 5 shows a simulation result of the band limiting filter for a digital data train of the ratio of the sampling frequencies of (4:1:1) by using the band limiting filter shown in FIG. 4. {7:0} in FIG. 5 denotes the data of 8 bits in which the 7th bit is the MSB and the 0th bit is LSB. A luminance signal Yin{7:0} and color difference signals Uin{7:0} and Vin{7:0} are inputted in response to a clock clk. As shown in FIG. 5, insufficient values between color difference signals Uout{7:0} and Vout{7:0} are interpolated by the band limiting filters 21U and 21V and resultant signals are outputted.

Figure 6A:
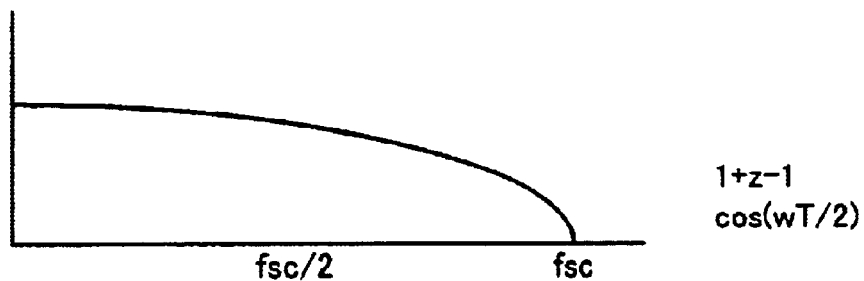
FIGS. 6A, 6B and 6C are examples of frequency characteristics of the band limiting filter applied to the invention.
Figure 6B:
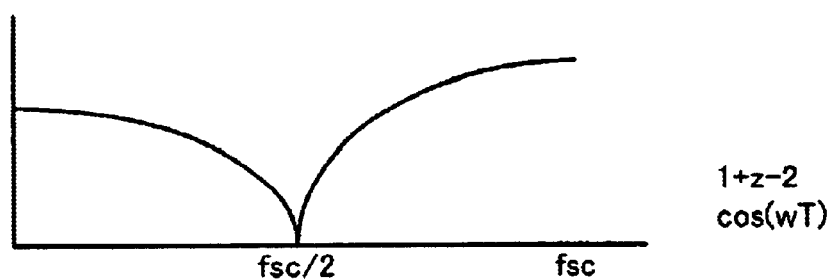
Figure 6C:
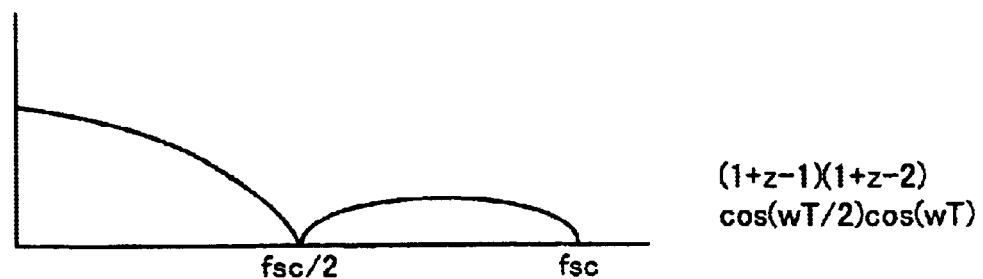

FIGS. 6A, 6B and 6C show frequency characteristics of the band limiting filter which is applied to the embodiment. $f_{sc}$ in FIGS. 6A, 6B and 6C denotes a sampling frequency of the color difference signal U or V in case of (4:1:1). The frequency characteristics of the band limiting filter shown in FIG. 6A relate to the case where the transfer function is set to $(1+z-1)$ and are applied to the case where the ratio of the sampling frequencies of the digital component signal which is supplied is equal to (4:2:2). FIG. 6A shows the frequency characteristics of the band limiting filter for allowing the color difference signal U or V of the band up to the sampling frequency $f_{sc}$ to pass.

By multiplying the characteristics of FIG. 6A of the transfer function $(1+z-1)$ and the characteristics of FIG. 6B of the transfer function $(1+z-2)$, the transfer function $(1+z-1)(1+z-2)$ shown in FIG. 6C is derived. The band limiting frequency characteristics of FIG. 6C are applied to the case where the ratio of the sampling frequencies is equal to (4:1:1). That is, when the ratio of the sampling frequencies is equal to (4:1:1), the signal is allowed to pass through the band limiting filter having the frequency characteristics shown in FIGS. 6A and 6B. FIG. 6C shows the frequency characteristics of the band limiting filter for allowing the color difference signal U or V of the band up to the sampling frequency $f_{sc}/2$ to pass. The high frequency components of the color difference signals are attenuated by the frequency characteristics of the band limiting filter shown here.

In the foregoing embodiment, the construction using the high speed switch has been shown as an example of mixing the signal of the ratio of the sampling frequencies of (4:4:4) and the signal of the ratio of the sampling frequencies of (4:2:2) or (4:1:1). However, the invention is not limited to such an example but those signals can be also added.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A signal processing apparatus for mixing a first digital component signal and a second digital component signal, each including both luminance and color components in which a sampling frequency ratio of said color component of said second digital component signal is lower than that of said first digital component signal, comprising:

a video signal processing circuit for partitioning said luminance and color components of said second digital signal before performing band limitation and delay adjusting to the components of said second digital signal;

a digital filter for performing said band limitation to the color component of said second digital component signal wherein a transfer function to be applied by said digital filter is selected in accordance with the sampling frequency ratio of said second digital component signal;

a delay adjusting circuit for performing said delay adjusting to only the luminance component of said second digital component signal;

mixing means for mixing said first digital component signal and said second digital component signal, said second digital component signal having said color component band limited and the timing of said luminance component delay adjusted before said mixing and outputting a mixed signal;

D/A converting means for D/A converting said mixed signal output from said mixing means from a digital to an analog signal; and a filter for performing filter processes to the analog signal converted by said D/A converting means and resulting from said mixing of said first digital component signal and said second digital component signal modified by said band limitation and said delay adjusting.

2. The apparatus according to claim 1, wherein said mixing means switches a luminance signal of said first digital component signal and a luminance signal of said second digital component signal from said delay adjusting means at a high speed and mixes the two luminance signals.

3. The apparatus according to claim 1, wherein said mixing means adds and mixes a luminance signal of said first digital component signal and a luminance signal of said second band limited digital component signal from said delay adjusting means.

4. The apparatus according to claim 1, wherein said first digital component signal is a text signal or a personal computer signal, and said second digital component signal is a video signal.

5. The apparatus according to claim 1, wherein said digital filter switches filter characteristics in accordance with the sampling frequency ratio of the color component of said second digital component signal.

* * * * *